UNITED STATES PATENT OFFICE 2,142,592

PROCESS FOR REFINING THE DARK COLORED KINDS OF COLOPHONY

Aleksander Waligóra, Szczebrzeszyn, Poland

No Drawing. Application February 23, 1937, Serial No. 127,193. In Poland May 4, 1936

1 Claim. (Cl. 260—107)

The dark red color of colophony renders it unsuitable for many industries, because the products made therefrom also have a darker coloring which detracts from their value. This dark coloring of the colophony is caused to a great extent, by the oxidized resinic and oxidized resinic acids possessing some of the properties of rubber resins which have an intensive dark cherry red coloring. Even a very small percentage of these substances dissolved in the colophony imparts thereto the above mentioned red coloring. The invention has for its object to separate from the colophony those substances which darken its yellow color, by dissolving the dark colophony in the constituents of mineral oil (crude oil, crude petroleum) which boil under atmospheric pressure at below 40° C., such as for example pentane, butane and propane, and in the isohomologues or mixtures thereof. At suitable concentration of the solution the oxidized resinic acids remain undissolved, whereas the light colored colophony is completely dissolved in the solvent. Under certain pressure- and temperature conditions a portion of the impurities can form an emulsion in the form of a colloidal suspension. This emulsion automatically breaks up after a certain time owing to the coagulation of the impurities. The process of breaking up of the emulsion can be accelerated by washing the same with pure water or aqueous solutions of the inorganic salts. After draining off the water and filtering off the colophony solution from the separated out impurities, and after subsequent evaporating of the said solvent a light colored colophony is obtained. The colophony can be dissolved either under atmospheric or increased pressure which latter is obtained by heating the solvent or by forcing in methane.

The colophony refining process above described presents the advantage over other processes that the refining itself consists in the dissolving of pure, light colophony and consequently in a purely physical procedure without utilizing chemical reagents, so that the constitution and the natural properties of the colophony itself remain unaffected. As the solvent is regenerated after evaporation, this process is economical and cheap. The character of the invention consists in that as selective solvent separating the impurities from the pure colophony crude oil constituents such as pentane, butane, propane and isohomologues or mixtures thereof are employed which boil at atmospheric pressure below 40° C.

Example I.—4 kilograms of dark colophony (the color of which corresponds to the grade "H" according to American nomenclature) were dissolved in 100 liters of butane under a pressure of 3 atmospheres. The solution was washed with water and after it has been filtered off from the impurities precipitated in the form of flakes and after evaporating of the butane, 3.95 kilograms of light lemon yellow colophony were obtained (the color of which corresponds to grade "W" of the American nomenclature).

Example II.—4 kilograms of dark colophony were dissolved in 100 liters of propane under a pressure of 8 atmospheres, washed with water and filtered off the impurities, whereupon the propane was evaporated and 3.94 kilograms light colophony were obtained.

Example III.—4 kilograms of dark colophony were dissolved in 6 litres of propane under a pressure of 6 atmospheres, whereupon the pressure was increased to 70 atmospheres by forcing in methane. The impurities were precipitated and filtered off, whereupon after the evaporation of the propane 3.8 kilograms of light colophony were obtained from the solution.

I claim:—

A process for refining colophony, consisting in dissolving merely the light colored colophony but not the impurities imparting to the colophony the dark coloring with the aid of crude oil constituents, boiling at atmospheric pressure below 40° C., such as pentane, butane, propane under pressure increased by forcing in methane, in separating the undissolved impurities by allowing to stand, and in filtering off the solvent to obtain the refined light colophony from the clear solution.

ALEKSANDER WALIGÓRA.